US008335659B2

(12) United States Patent
Hernandez-Oliver et al.

(10) Patent No.: US 8,335,659 B2
(45) Date of Patent: Dec. 18, 2012

(54) LINEAR POSITION SENSOR SYSTEM

(75) Inventors: Salvador Hernandez-Oliver, Winston Salem, NC (US); Lyle Stanley Bryan, Advance, NC (US); Marco Wolf, De Haan (BE); Stefan Trauthwein, Herxheim (DE)

(73) Assignee: Tyco Electronics Corporation, Berwyn, PA (US)

( * ) Notice: Subject to any disclaimer, the term of this patent is extended or adjusted under 35 U.S.C. 154(b) by 207 days.

(21) Appl. No.: 12/836,901

(22) Filed: Jul. 15, 2010

(65) Prior Publication Data
US 2012/0016625 A1    Jan. 19, 2012

(51) Int. Cl.
*G01C 9/00* (2006.01)
*G01D 18/00* (2006.01)
*G01D 21/00* (2006.01)
*G01P 21/00* (2006.01)

(52) U.S. Cl. ............... 702/150; 702/85; 702/88; 702/94
(58) Field of Classification Search ............... 702/33, 702/38, 57, 85, 86, 87, 92, 94, 150, 155, 702/158; 73/1.75, 1.79; 324/301, 302, 200, 324/202, 207.11, 207.13, 207.23, 207.24, 324/244, 245, 246, 260
See application file for complete search history.

(56) References Cited

U.S. PATENT DOCUMENTS

| 5,453,684 | A | 9/1995 | Nakayama |  |
|---|---|---|---|---|
| 6,690,159 | B2 * | 2/2004 | Burreson et al. | 324/207.23 |
| 7,023,201 | B2 * | 4/2006 | Sogge et al. | 324/207.25 |
| 7,191,078 | B2 * | 3/2007 | Smith et al. | 702/66 |
| 2008/0046214 | A1 * | 2/2008 | Fowler | 702/150 |
| 2010/0091926 | A1 | 4/2010 | Kishibe et al. |  |

FOREIGN PATENT DOCUMENTS

| DE | 198 36 599 |  | 2/2000 |
| DE | 10 2008 045 177 | A1 | 3/2010 |
| EP | 0 979 988 |  | 2/2000 |
| EP | 1 074 815 | A1 | 2/2001 |
| EP | 1 847 810 | A1 | 10/2007 |

OTHER PUBLICATIONS

International Search Report, International Application No. PCT/US2011/001228, International Filing Date Jul. 13, 2011.
Melexis, Application Note, Magnets for MLX90333 Linear Position Sensor, Aug. 2007, (90333-LP-AP-210807), pp. 1-12, Rev. 001.
Melexis, Application Note, Magnets for MLX90333 Linear Position Sensor, Aug. 2007, (90333-LP-AO-060807), pp. 1-12, Rev. 002.
Melexis, MLX90333, Triaxis 3D-Joystick Position Sensor, Data Sheet Jan. 2008, (3901090333), pp. 1-43, Rev. 001.

* cited by examiner

*Primary Examiner* — Mohamed Charioui
*Assistant Examiner* — Ricky Ngon (57) ABSTRACT

A position sensor measures a magnetic flux of a magnetic field produced by a magnet system in a first direction and a second direction. Values associated with the measured magnetic flux in the first direction are adjusted based on a first gain and a first offset that are determined based on the measured magnetic flux and a reference magnetic flux in the first direction. Values associated with the measured magnetic flux in the second direction are adjusted based on a second gain and a second offset that are determined based on the measured magnetic flux and a reference magnetic flux in the second direction. A position of the magnet system with respect to the position sensor at a given time may then be determined based on the adjusted values of the magnetic flux in the first and second directions at the given time.

22 Claims, 5 Drawing Sheets

LINEAR POSITION SENSOR SYSTEM

BACKGROUND

Linear position sensor systems are often utilized to monitor the movement of a mechanical component, such as a hydraulic actuator, a brake system, or a transmission. In known linear position sensor systems comprising a magnet and a position sensor, as the magnet moves in a linear direction with respect to the position sensor, the position sensor may measure a magnetic flux produced by the magnet and produce an electrical signal that varies as the position of the magnet varies.

Figure 1:
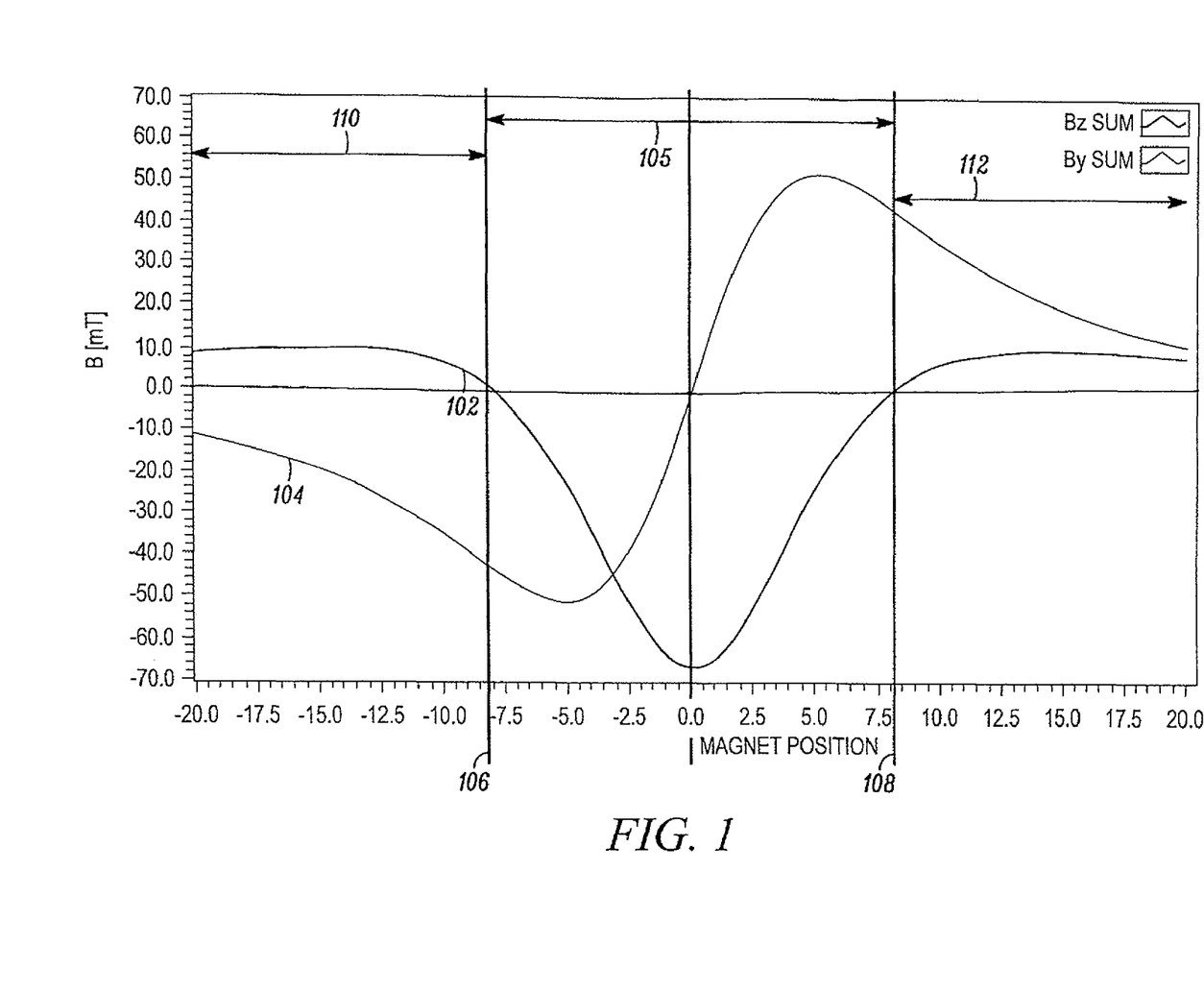
FIG. 1 is a graph illustrating an output of a known linear position sensor system.

FIG. 1 is a graph illustrating an output of a known linear position sensor system. FIG. 1 illustrates a magnetic flux in a first direction 102 as measured by a position sensor vs. a position of the magnet with respect to the position sensor. FIG. 1 additionally illustrates a magnetic flux in a second direction 104 as measured by a position sensor vs. the position of the magnet with respect to the position sensor. Current linear position sensor systems are only accurate in an area 105 between approximately a first zero crossing 106 of the magnetic flux in the first direction and approximately a second zero crossing 108 of the magnetic flux in the first direction where tolerances associated with ambient temperature, a geometry of a linear position sensor system, an air gap within a linear position sensor system, a material of a magnet, an angle of magnetization, and pole magnetization have minimal impact on the ability of the position sensor to detect a position of a magnet with respect to the position sensor.

Accordingly, it is desirable to produce linear position sensor systems capable of operating with greater magnet stroke lengths that are able to detect a position of the magnet in an area 110 past the first zero crossing 106 of the magnetic flux in the first direction and detect a position of the magnet in an area 112 past the second zero crossing 108 of the magnetic flux in the first direction where factors such as ambient temperature, a geometry of a linear position sensor system, an air gap within a linear position sensor system, a material of a magnet, an angle of magnetization, and pole magnetization have more significant impact on the ability of the position sensor of the linear position sensor system to detect a position of a magnet system with respect to the position sensor.

DETAILED DESCRIPTION OF THE DRAWINGS

Linear position sensor systems utilizing three-dimensional/two-dimensional hall technology that are capable of accurately detecting a position of a magnetic system with respect to a position sensor at extended magnet stroke lengths are described below. The linear positions sensor systems described below are able to operate at extended magnet stroke lengths, such as in areas 110, 112 past the zero crossings of the magnetic flux in the first direction 106, 108 described above with respect to FIG. 1, where factors such as ambient temperature, a geometry of a linear position sensor system, an air gap within a linear position sensor system, a material of a magnet, an angle of magnetization, and pole magnetization impact the ability of a position sensor of the linear position sensor system to detect a position of a magnet system with respect to the position sensor.

Figure 2:
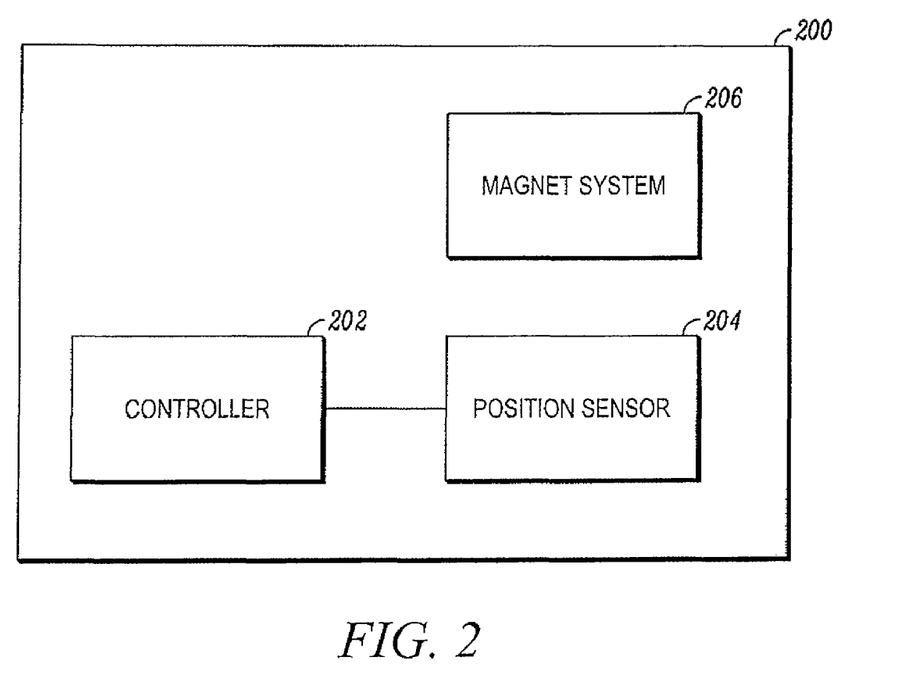
FIG. 2 is a block diagram of one implementation of a linear position sensor system utilizing three-dimensional/two-dimensional hall technology for detecting a position of a magnet system with respect to a position sensor.

FIG. 2 is a block diagram of a linear position sensor system 200 for detecting a position of a magnet system. Generally, the linear position sensor system 200 includes a controller 202, a position sensor 204, and a magnet system 206. The magnet system 206 is positioned relative to the position sensor 204 in the linear position sensor system 200 such that the magnet system 206 moves in a linear direction relative to the position sensor 204. In some implementations, the magnet system 206 may include one magnet, where in other implementations, the magnet system 206 includes more than one magnet. Examples of magnets that may be used in the magnet system 206 include permanent ring magnets and permanent cylindrical magnets. However, other types of magnets may be used. In some implementations, the magnet system may be positioned on a hydraulic actuator, a brake position sensor, a transmission, or a clutch petal.

During operation, as the magnet system 206 moves with respect to the position sensor 204, the position sensor 204 measures the magnetic flux created by the magnet system 206 in at least two directions. Examples of position sensors 204 that may be used in the linear position sensor system 200 include linear magnetic sensors and magnetic switches or latches. In some implementations, the position sensor 204 measures the magnetic flux that the magnet system 206 applies orthogonally to the surface of the position sensor 204 and the position sensor 204 measures the magnetic flux that the magnet system 206 applies parallel to the surface of the position sensor 204. However, the position sensor 204 may additionally or alternatively measure the magnetic flux that the magnet system 206 applies in one or more other directions to the surface of the position sensor 204.

The controller 202 is in communication with the position sensor 204 and utilizes the magnetic flux measurements of the position sensor 204 to determine a position of the magnet system 206 with respect to the position sensor 204 at a given time. In some implementations, the controller 202 may be an application-specific integration circuit ("ASIC"), where in other implementations, the controller 202 comprises one or more processors, such as a microprocessor, and one or more memory modules, such as a tangible computer-readable storage medium. In these implementations, the processor is configured to execute instructions stored in the memory to cause the system 200 to detect a position of the magnet system 206 with respect to the position sensor 204.

As explained in more detail below, to detect a position of the magnet system 206, the controller 202 calculates a first offset and a first gain for magnetic flux measurements associated with the magnetic flux in the first direction. The controller 202 compares the magnetic flux measurements associated with the magnetic flux in the first direction to reference flux measurements associated with the magnetic flux in the first direction that are stored in the controller 202. In some implementations, the controller 202 calculates the first offset and the first gain based on one or more measured maximum flux values, a measured minimum flux value, one or more reference maximum values, and a reference minimum flux value.

Similarly, the controller 202 calculates a second offset and a second gain for the magnetic flux measurements associated with the magnetic flux in a second direction that is different from the first direction. The controller 202 compares the magnetic flux measurements associated with the magnetic flux in the second direction to reference flux measurements associated with the magnetic flux in the second direction that are stored in the controller 202. In some implementations, the controller 202 calculates the second offset and the second gain based on a measured maximum flux, a measured minimum flux value, a reference maximum flux value, and a reference minimum flux value.

The controller 202 adjusts at least a portion of the magnetic flux measurements associated with the magnetic flux in the first direction based on the first gain and the first offset, and the controller 202 adjusts at least a portion of the magnetic flux measurements associated with the magnetic flux in the second direction based on the second gain and the second offset. The controller 202 may then determine a position of the magnet system 206 with respect to the position sensor 204 at a given time based on the adjusted values of the measured magnetic flux in the first direction at the given time and the adjusted values of the measured magnetic flux in the second direction at the given time.

By adjusting the measured magnetic flux values to align with the ideal, reference magnetic flux values, the linear position sensor system 200 is able to operate at stroke lengths where factors such as ambient temperature, a geometry of a linear position sensor system, an air gap within a linear position sensor system, a material of a magnet, an angle of magnetization, and pole magnetization have impact the ability of a position sensor 204 to detect a position of a magnet system 206 with respect to the position sensor 204, such as in areas 110, 112 past the zero crossings of the magnetic flux in the first direction 106, 108 described above with respect to FIG. 1.

Figure 3:
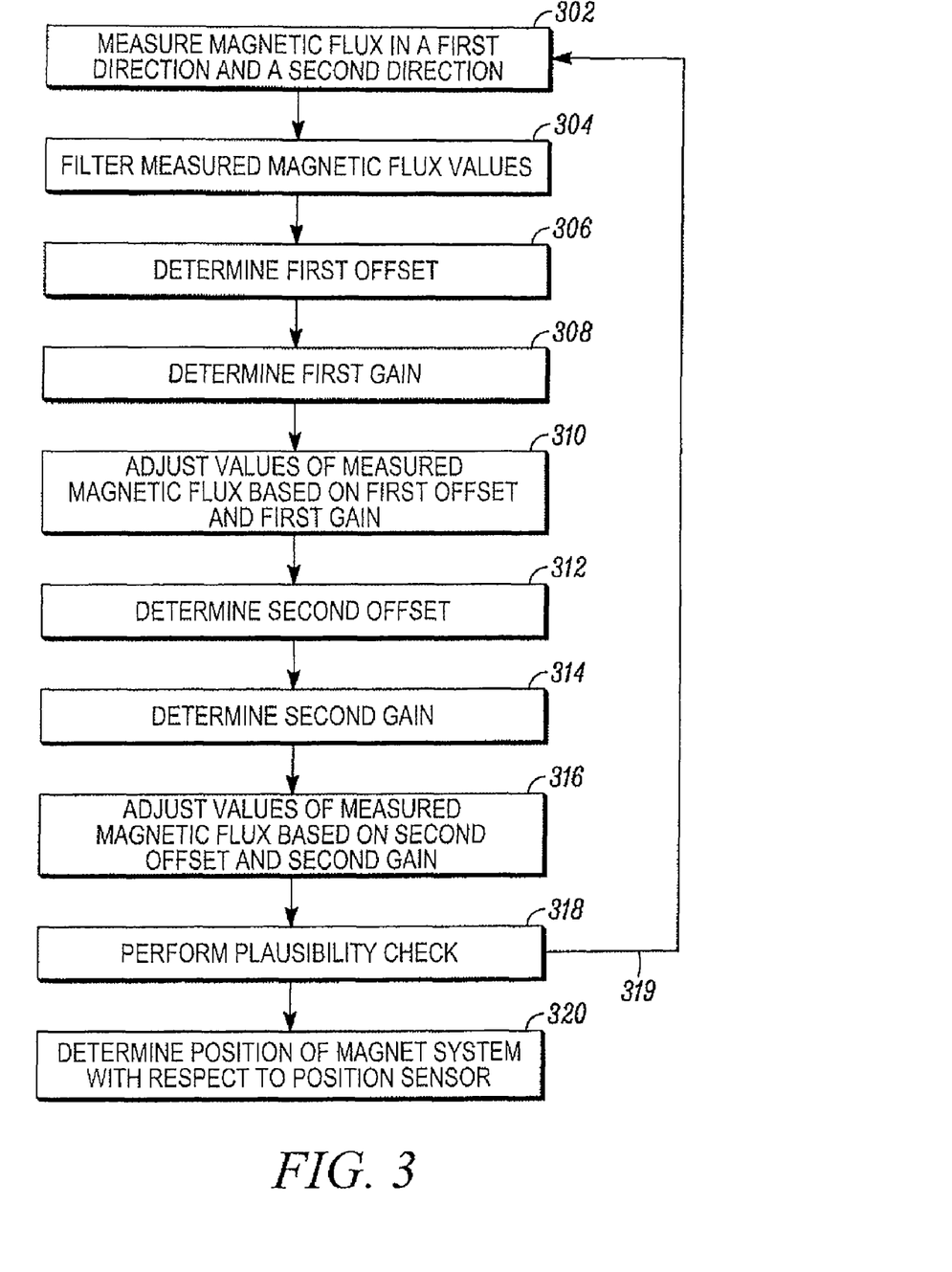
FIG. 3 is a flow chart of one implementation of a method for detecting a position of a magnet system with respect to a position sensor.

FIG. 3 is a flow chart of one implementation of a computer-implemented method for detecting a position of a magnet system with respect to a position sensor, such as in the linear position sensor system described above with respect to FIG. 2. At step 302, a position sensor measures a magnetic flux of a magnet field in a first direction that is produced by a magnet system moving in a linear direction with respect to the position sensor, and the position sensor measures a magnetic flux of a magnetic field in a second direction that is produced by the magnetic system moving in the linear direction with respect to the position sensor, where the first direction and the second direction are different directions. In one implementation, the magnetic flux in the first direction is a magnetic flux that is orthogonal to the surface of the position sensor and the magnetic flux in the second direction is a magnetic flux that is parallel to the surface of the position sensor. However, it will be appreciated that other directions of magnetic flux could also be used.

Figure 4:
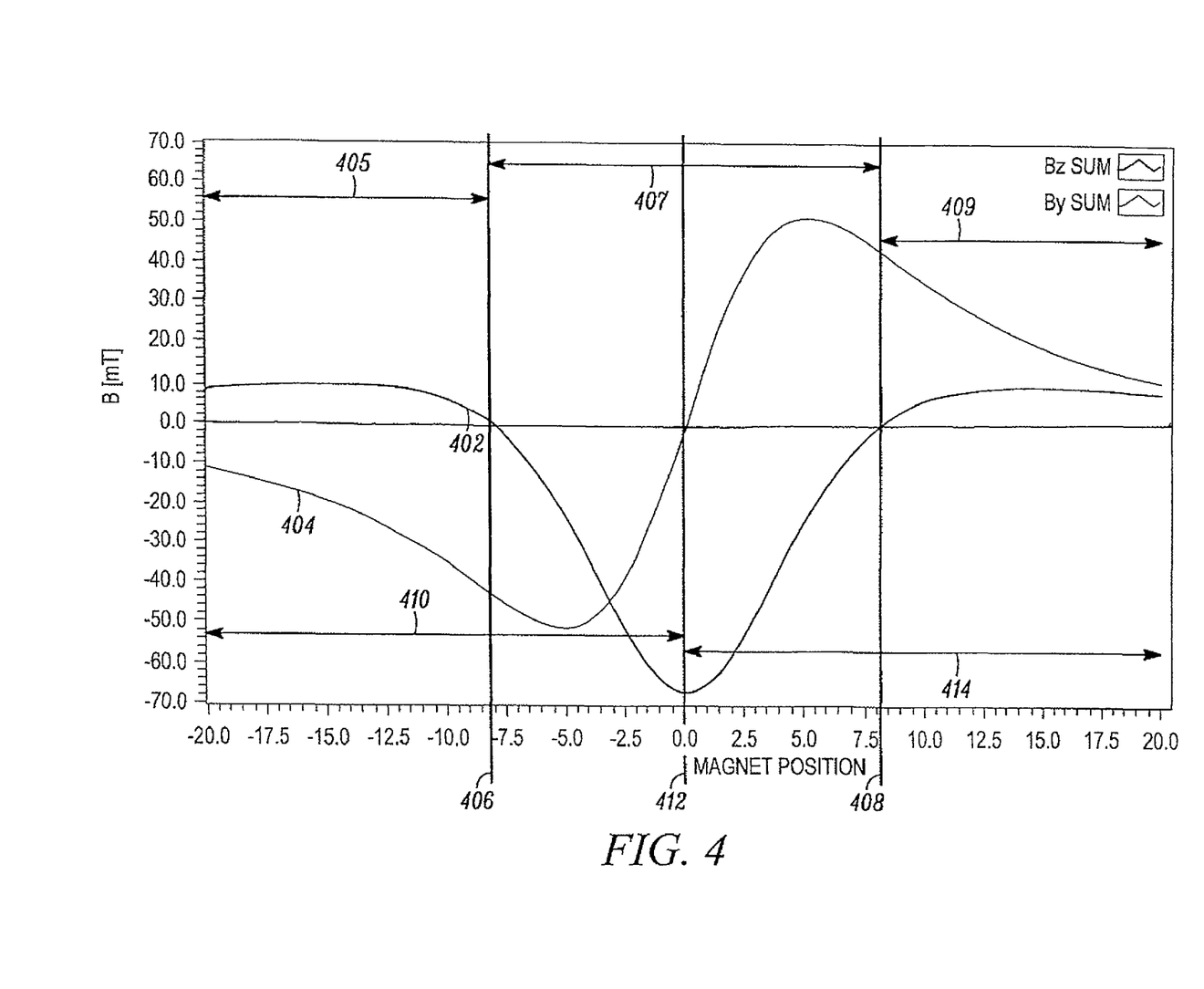
FIG. 4 is a graph illustrating a measured magnetic flux in a first direction and a measured magnetic flux in a second direction vs. a position of a magnet system with respect to a position sensor.

An example of the measured magnetic flux in the first direction and the measured magnetic flux in the second direction vs. a position of the magnet system with respect to the position sensor are illustrated in FIG. 4. The measured magnetic flux in the first direction is labeled 402 and the measured magnetic flux in the second direction is labeled 404.

Referring again to FIG. 3, in some implementations, at step 304, the controller may filter one or more measured magnetic flux values from the measured magnetic flux in the first direction prior to determining the first offset and the first gain and/or the controller may filter one or more measured magnetic flux values from the measured magnetic flux in the second direction prior to determining the second offset and the second gain. For example, the controller may filter measured magnetic flux values from the measured magnetic flux in the first and/or second directions based on whether the values of the measured magnetic flux are within a predetermined amount of an ideal, reference magnetic flux.

At step 306, the controller determines a first offset based on a first measured maximum flux value, a second measured maximum flux value, and a measured minimum flux value associated with the measured magnetic flux in the first direction, and a first reference maximum flux value, a second reference maximum flux value, and a reference minimum flux value associated with the magnetic flux in the first direction. As discussed above, in some implementations the first reference maximum flux value, the second reference maximum flux value, and the reference minimum flux value associated with the magnetic flux in the first direction are stored in the controller.

Figure 5:
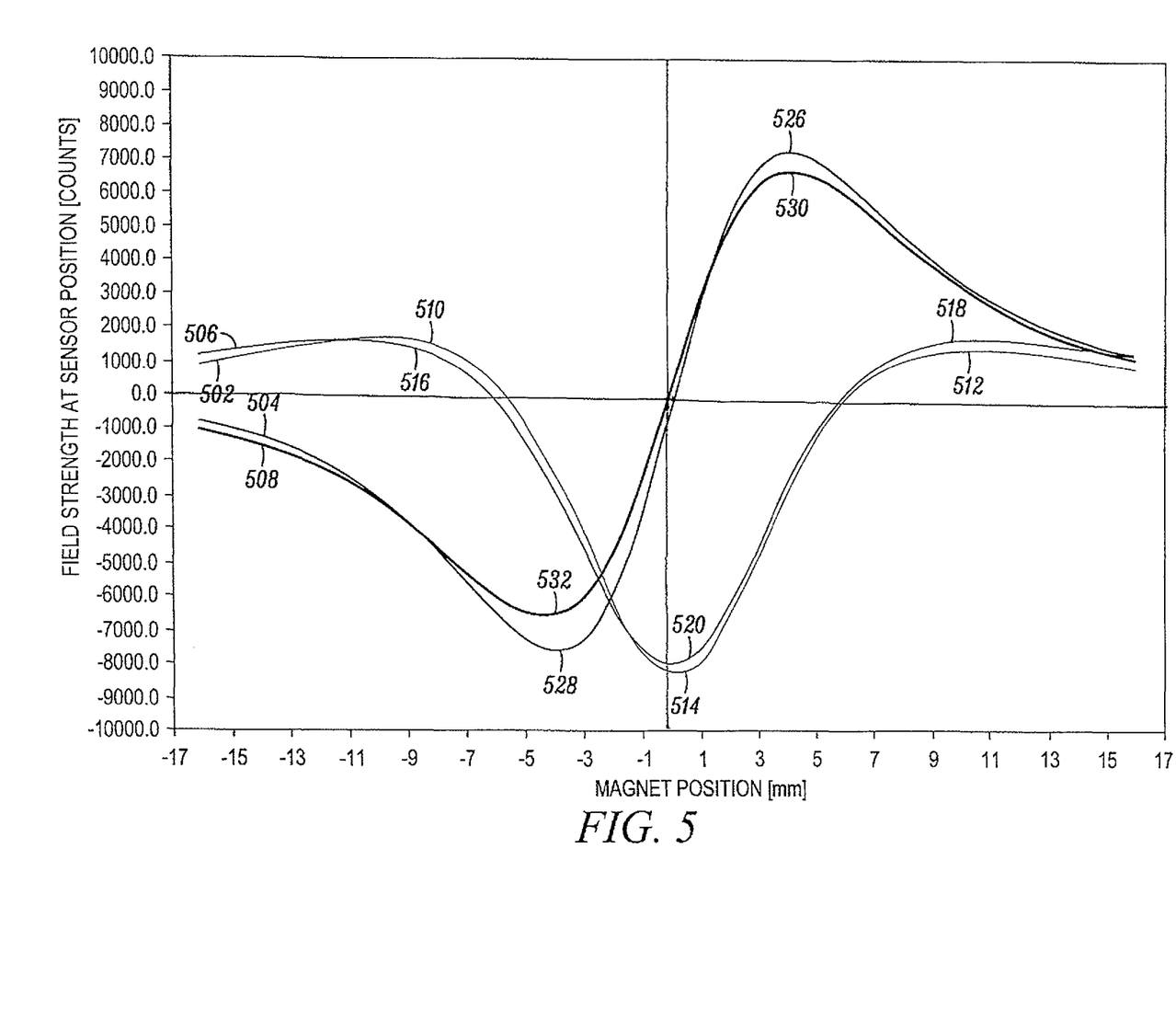
FIG. 5 is a graph illustrating a measured magnetic flux in a first direction and a measured magnetic flux in a second direction vs. a position of a magnet system with respect to a position sensor, and illustrating a reference magnetic flux in the first direction and a reference magnetic flux in the second direction vs. a position of the magnet system with respect to the position sensor.

FIG. 5 is a diagram illustrating the measured magnetic flux in the first direction 502 and the measured magnetic flux in the second direction 504 vs. a position of the magnet system with respect to the position sensor. FIG. 5 additionally illustrates a reference magnetic flux in the first direction 506 and a reference magnetic flux in the second direction 508 vs. a position of the magnet system with respect to the position sensor. The reference magnetic fluxes 506, 508 represent ideal magnetic flux measurements where factors such as ambient temperature, a geometry of a linear position sensor system, an air gap within a linear position sensor system, a material of a magnet, an angle of magnetization, and pole magnetization do not impact the ability of a position sensor to detect a position of a magnet system with respect to the position sensor.

The measured magnetic flux in the first direction 502 includes a first measured maximum flux value 510, a second measured maximum flux value 512, and a measured minimum flux 514. Similarly, the reference magnetic flux in the first direction 506 includes a first reference maximum flux value 516, a second reference maximum flux value 518, and a reference minimum flux value 520. The first offset generally represents error within the linear position sensor system caused by factors such as ambient temperature, a geometry of a linear position sensor system, an air gap within a linear position sensor system, a material of a magnet, an angle of magnetization, and pole magnetization.

In some implementations, at step 306 the controller determines the first offset using the equation:

$$FirstOffset = \frac{\Phi_{min\ M} \cdot \frac{\Phi_{max\ R}}{\Phi_{min\ R}} - \Phi_{max\ R}}{1 - \frac{\Phi_{max\ R}}{\Phi_{min\ R}}},$$

where $\Phi_{max\ R}$ is a mean of the first reference maximum flux value and the second reference maximum flux value, $\Phi_{min\ R}$ is the reference minimum flux value, $\Phi_{max\ M}$ is a mean of the first measured maximum flux value and the second measured maximum flux value, and $\Phi_{min\ M}$ is the measured minimum flux value associated with the magnetic flux in the first direction. However, it will be appreciated that the first offset may be calculated in other ways based on a first measured maximum flux value, a second measured maximum flux value, and a measured minimum flux value associated with the measured magnetic flux in the first direction, and a first reference maximum flux value, a second reference maximum flux value, and a reference minimum flux value associated with the magnetic flux in the first direction.

At step 308, the controller determines the first gain based on the first offset, the first measured maximum flux value, and the first reference maximum flux value associated with the magnetic flux in the first direction; based on the first offset, the second measured maximum flux value, and the second reference maximum flux value associated with the magnetic flux in the first direction; or based on the first offset, the measured minimum flux value, and the reference minimum flux value associated with the magnetic flux in the first direction. For example, referring to FIG. 4, the controller may determine the first gain based on the first offset, the first measured maximum flux value, and the first reference maximum flux value in an area 405 up until a first zero crossing 406 associated with the magnetic flux in the first direction 402. The controller may determine the first gain based on the first offset, the measured minimum flux value, and reference minimum flux value in an area 407 between the first zero crossing 406 associated with the magnetic flux in the first direction 402 and a second zero crossing 408 associated with the magnetic flux in the first direction 402. Further, the controller may determine the first gain based on the first offset, the second measured maximum flux value, and the second reference maximum flux value in an area 409 after the second zero crossing 408 associated with the magnetic flux in the first direction 402.

Similar to the first offset, the first gain generally represents error within the linear position sensory system caused by factors such as ambient temperature, a geometry of a linear position sensor system, an air gap within a linear position sensor system, a material of a magnet, an angle of magnetization, and pole magnetization. In some implementations, at step 308 the controller determines the first gain based on the first offset, one of the first measured maximum flux value and the second measured maximum flux value, and one of the first reference maximum flux value and the second reference maximum flux value associated with the magnetic flux in the first direction using the equation:

$$FirstGain = \frac{\Phi_{max\ R}}{FirstOffset + \Phi_{max\ M}},$$

where $\Phi_{max\ R}$ is one of the first reference maximum flux value and the second reference maximum flux value and $\Phi_{max\ M}$ is one of the first measured maximum flux value and the second measured maximum flux value. However, it will be appreciated that the first gain may be calculated in other ways based on the first offset, one of the first measured maximum flux value and the second measured maximum flux value, and one of the first reference maximum flux value and the second reference maximum flux value associated with the magnetic flux in the first direction.

Further, in some implementations, at step 308 the controller determines the first gain based on the first offset, the measured minimum flux value, and the reference minimum flux value associated with the magnetic flux in the first direction using the equation:

$$FirstGain = \frac{\Phi_{min\ R}}{FirstOffset + \Phi_{min\ M}},$$

where $\Phi_{min\ R}$ is the reference minimum flux value and $\Phi_{min\ M}$ is the measured minimum flux value. However, it will be appreciated that the first gain may be calculated in other ways based on the first offset, the measured minimum flux value, and the reference minimum flux value associated with the magnetic flux in the first direction.

At step 310, the controller adjusts at least a portion of the values in the measured magnetic flux in the first direction based on the first gain and the first offset. In some implementations, the controller adjusts the values of the measured magnetic flux in the first direction at one or more zero crossings associated with the magnetic flux in the first direction and/or at one or more zero crossings associated with the magnetic flux in the second direction. It will be appreciated that updating values of the measured magnetic fluxes at zero crossings associated with the magnetic flux in the first direction and/or the second direction assists in providing smooth curves for the measured magnetic fluxes as the values of the measured magnetic fluxes are adjusted.

At step 312, the controller determines a second offset based on a measured maximum flux value and a measured minimum flux value associated with the measured magnetic flux in the second direction, and a reference maximum flux value and a reference minimum flux value associated with the magnetic flux in the second direction. Referring again to FIG. 5, the measured magnetic flux in the second direction 504 includes a measured maximum flux value 526 and a measured minimum flux 528, and the reference magnetic flux in the second direction 508 includes a reference maximum flux value 530 and a reference minimum flux value 532. As with the first offset, the second offset generally represents error within the linear position sensory system caused by factors such as ambient temperature, a geometry of a linear position sensor system, an air gap within a linear position sensor system, a material of a magnet, an angle of magnetization, and pole magnetization.

In some implementations, at step 312 the controller determines the second offset using the equation:

$$SecondOffset = \frac{\Phi_{min\ M} \cdot \frac{\Phi_{max\ R}}{\Phi_{min\ R}} - \Phi_{max\ R}}{1 - \frac{\Phi_{max\ R}}{\Phi_{min\ R}}},$$

where $\Phi_{max\ R}$ is the reference maximum flux value, $\Phi_{min\ R}$ is the reference minimum flux value, $\Phi_{max\ M}$ is the measured maximum flux value, and $\Phi_{n\ M}$ is the measured minimum flux value associated with the magnetic flux in the second direction. However, it will be appreciated that the second offset may be calculated in other ways based on the measured maximum flux value and the measured minimum flux value associated with the measured magnetic flux in the second direction and the reference maximum flux value and the reference minimum flux value associated with the magnetic flux in the second direction At step 314, the controller determines the second gain based on the second offset, the measured maximum flux value, and the reference maximum flux value associated with the magnetic flux in the second direction, or alternatively, the controller determines the second gain based on the second offset, the measured minimum flux value and the reference minimum flux value associated with the magnetic flux in the second direction. For example, referring to FIG. 4, the controller may determine the second gain based on the second offset, the measured minimum flux value, and the reference minimum flux value in an area 410 up to a zero crossing 412 associated with the magnetic flux in the second direction 404, and the controller may determine the second gain based on the second offset, the measured maximum flux value, and the reference maximum flux value in an area 414 after the zero crossing 410 associated with the magnetic flux in the second direction 404.

Similar to the first gain, the second gain generally represents error within the linear position sensory system caused by factors such as ambient temperature, a geometry of a linear position sensor system, an air gap within a linear position sensor system, a material of a magnet, an angle of magnetization, and pole magnetization. In some implementations, at step 314 the controller determines the second gain based on the second offset, the measured maximum flux value, and the reference maximum flux value associated with the magnetic flux in the second direction using the equation:

$$SecondGain = \frac{\Phi_{max\ R}}{SecondOffset + \Phi_{max\ M}},$$

where $\Phi_{max\ R}$ is the reference maximum flux value and $\Phi_{max\ M}$ is the measured maximum flux value. However, it will be appreciated that the second gain may be calculated in other ways based on the second offset, the measured maximum flux value, and the reference maximum flux value associated with the magnetic flux in the second direction.

Further, in some implementations, at step 314 the controller determines the second gain based on the second offset, the measured minimum flux value, and the reference minimum flux value associated with the magnetic flux in the second direction using the equation:

$$SecondGain = \frac{\Phi_{min\ R}}{SecondOffset + \Phi_{min\ M}},$$

where $\Phi_{min\ R}$ is the reference minimum flux value and $\Phi_{min\ M}$ the measured minimum flux value. However, it will be appreciated that the second gain may be calculated in other ways based on the second offset, the measured minimum flux value, and the reference minimum flux value associated with the magnetic flux in the second direction.

At step 316, the controller adjusts at least a portion of the values in the measured magnetic flux in the second direction based on the second gain and the second offset. In some implementations, the controller adjusts the values of the measured magnetic flux in the second direction at one or more zero crossings associated with the magnetic flux in the first direction and/or at one or more zero crossings associated with the magnetic flux in the second direction.

In some implementations, at step 318, the controller may check to see if the linear position sensor system is malfunctioning by performing one or more plausibility checks. For example, the controller may perform a plausibility check with respect to the magnetic flux in the first direction by determining whether the first measured maximum magnetic flux is within a predetermined amount of the first reference maximum magnetic flux; whether the second measured maximum magnetic flux is within a predetermined amount of the second reference maximum magnetic flux; whether the measured minimum magnetic flux is within a predetermined amount of the reference minimum magnetic flux; whether the first offset exceeds a predetermined threshold; and/or whether the first gain exceed a predetermined threshold.

Similarly, the controller may perform a plausibility check with respect to the magnetic flux in the second direction by determining whether the measured maximum magnetic flux is within a predetermined amount of the reference maximum magnetic flux; whether the measured minimum magnetic flux is within a predetermined amount of the reference minimum magnetic flux; whether the second offset exceeds a predetermined threshold; and/or whether the second gain exceeds a predetermined threshold. If the controller determines that the linear position sensor system fails the plausibility check with respect to the magnetic flux in the first direction and/or the magnetic flux in the second direction, the controller may determine that the linear position sensor system is malfunctioning and not proceed to determine a position of the magnet system.

It will be appreciated that in some implementations, the method loops 319 to repeat the above-described steps over multiple strokes of the magnet system with respect to the position sensor even as, at step 320, the controller determines a position of the magnet system with respect to the position sensor.

At step 320, the controller determines a position of the magnet system at a given time based on the adjusted values of the measured magnetic flux in the first direction at the given time and the adjusted values of the measured magnetic flux in the second direction at the given time. In one implementation, to determine the position of the magnet system the controller determines a relationship, such as an angle, between the adjusted value of the measured magnetic flux in the first direction at the given time and the adjusted value of the measured magnetic flux in the second direction at the given value. The controller obtains a value from a lookup table based on the determined relationship and linearizes the value from the lookup table to determine the position of the magnet system with respect to the position sensor at the given time.

In another implementation, to determine the position of the magnet system the controller utilizes an arctangent function to determine a relationship between the adjusted value of the measured magnetic flux in the first direction at the given time and the adjusted value of the measured magnetic flux in the second direction at the given time. The controller then utilizes a polynomial position function to determine a value associated with the determined relationship and linearizes the value to determine the position of the magnet system with respect to the position sensor at the given time.

In yet another implementation, to determine the position of the magnet system the controller utilizes a coordinate rotation digital computer ("CORDIC") function to determine an angle based on the adjusted value of the measured magnetic flux in the first direction at the given time and the adjusted value of the measured flux in the second direction at the given time. The controller then utilizes a polynomial position function to determine a value associated with the determined angle and linearizes the value to determine the position of the magnet system with respect to the sensor at the given time.

As described above, linear position sensor systems may utilize three-dimensional/two-dimensional hall technology by measuring the magnetic flux produced by a magnet system in at least two directions. The measured magnetic fluxes are compared to ideal reference magnetic fluxes to determine offsets and gains associated with each measured direction of the magnetic flux. Using the determined offsets and gains, the values of the measured magnet fluxes are adjusted such that the linear position sensor system may accurately detect a position of a magnetic system with respect to a position sensor at extended magnet stroke lengths even where factors such as ambient temperature, a geometry of a linear position sensor system, an air gap within a linear position sensor system, a material of a magnet, an angle of magnetization, and pole magnetization have a significant impact on the ability of a position sensor to detect a position of a magnet system with respect to the position sensor. The ability to detect a position of a magnet system with respect to a position sensor at extended magnet stroke lengths provides advantages such as the ability to use smaller sized magnets in linear position sensor systems and the ability to detect a position of a magnet over a greater range of movement in mechanical devices.

It is intended that the foregoing detailed description be regarded as illustrative rather than limiting, and that it be understood that it is the following claims, including all equivalents, that are intended to define the spirit and scope of this invention.

The invention claimed is:

1. A computer-implemented method for detecting a position of a magnet system, the method comprising:

measuring, at a position sensor, a magnetic flux of a magnetic field in a first direction that is produced by a magnet system and measuring, at the position sensor, a magnetic flux of a magnetic field in a second direction that is produced by the magnet system, where the first direction and the second direction are different directions;

determining, with a controller, a first offset based on a first measured maximum flux value, a second measured maximum flux value, and a measured minimum flux value associated with the measured magnetic flux in the first direction and a first reference maximum flux value, a second reference maximum flux value and a reference minimum flux value associated with the magnetic flux in the first direction;

determining, with the controller, a first gain based on the first offset, one of the first measured maximum flux value and the second measured maximum flux value, and one of the first reference maximum flux value and the second reference maximum flux value associated with the magnetic flux in the first direction, or based on the first offset, the measured minimum flux value, and the reference minimum flux value associated with the magnetic flux in the first direction;

adjusting, with the controller, at least a portion of the values of the measured magnetic flux in the first direction based on the first gain and the first offset, where the adjustment occurs at at least one of a zero crossing associated with the magnetic flux in the first direction and a zero crossing associated with the magnetic flux in the second direction;

determining, with the controller, a second offset based on a measured maximum flux value and a measured minimum flux value associated with the measured magnetic flux in the second direction and a reference maximum flux value and a reference minimum flux value associated with the magnetic flux in the second direction;

determining, with the controller, a second gain based on the second offset, the measured maximum flux value, and the reference maximum flux value associated with the magnetic flux in the second direction, or based on the second offset, the measured minimum flux value, and the reference minimum flux value associated with the magnetic flux in the second direction;

adjusting, with the controller, at least a portion of the values of the measured magnetic flux in the second direction based on the second gain and the second offset, where the adjustment occurs at at least one of a zero crossing associated with the magnetic flux in the first direction and a zero crossing associated with the magnetic flux in the second direction; and determining, with the controller, a position of the magnet system with respect to the position sensor at a given time based on the adjusted values of the measured magnetic flux in the first direction and the adjusted values of the measured magnetic flux in the second direction.

2. The computer-implemented method of claim 1, wherein determining the position of the magnet system with respect to the position sensor at a given time comprises:

obtaining a value from a lookup table that is associated with a relationship between the adjusted value of the measured magnetic flux in the first direction at the given time and the adjusted value of the measured magnetic flux in the second direction at the given time; and linearizing the value from the lookup table.

3. The computer-implemented method of claim 2, wherein obtaining a value from a lookup table comprises:

determining a relationship between the adjusted value of the measured magnetic flux in the first direction at the given time and the adjusted value of the measured magnetic flux in the second direction at the given time using an arctangent function; and obtaining a value from a lookup table associated with the determined relationship.

4. The computer-implemented method of claim 2, wherein obtaining a value from a lookup table comprises:

determining an angle based on the adjusted value of the measured magnetic flux in the first direction at the given time and the adjusted value of the measured magnetic flux in the second direction at the given time using a coordinate rotation digital computer ("CORDIC") function; and obtaining a value from a lookup table associated with the determined angle.

5. The computer-implemented method of claim 1, wherein determining the position of the magnet system with respect to the position sensor at a given time comprises:

determining a relationship between the adjusted value of the measured magnetic flux in the first direction at the given time and the adjusted value of the measured magnetic flux in the second direction at the given time using an arctangent function;

determining a value associated with the relationship using a polynomial position function; and linearizing the value.

6. The computer-implemented method of claim 1, wherein determining the position of the magnet system with respect to the position sensor at a given time comprises:

determining an angle based on the adjusted value of the measured magnetic flux in the first direction at the given time and the adjusted value of the measured flux in the second direction at the given time using a coordinate rotation digital computer ("CORDIC") function;

determining a value associated with the angle using a polynomial position function; and linearizing the value.

7. The computer-implemented method of claim 1, wherein the magnet system comprises one magnet.

8. The computer-implemented method of claim 1, wherein the magnet system comprises more than one magnet.

9. The computer-implemented method of claim 1, further comprising:

determining whether the position sensor is malfunctioning based on at least one of a plausibility check associated with the first measured maximum magnetic flux, the second measured maximum magnetic flux, the measured minimum magnetic flux, the first reference maximum magnetic flux, the second reference maximum flux and the reference minimum magnetic flux in the first direction, and a plausibility check associated with the measured maximum magnetic flux, the measured minimum magnetic flux, the reference maximum magnetic flux, and the reference minimum magnetic flux in the second direction.

10. The computer-implemented method of claim 1, further comprising:
filtering values from at least one of the measured magnetic flux in the first direction prior to determining the first offset and the first gain, and the measured magnetic flux in the second direction prior to determining the second offset and the second gain.

11. The computer-implemented method of claim 1, wherein determining the first offset comprises:
calculating the first offset using the equation:

$$FirstOffset = \frac{\Phi_{min\ M} \cdot \frac{\Phi_{max\ R}}{\Phi_{min\ R}} - \Phi_{max\ R}}{1 - \frac{\Phi_{max\ R}}{\Phi_{min\ R}}},$$

wherein $\Phi_{max\ R}$ is a mean of the first reference maximum flux value and the second reference maximum flux value, $\Phi_{min\ R}$ is the reference minimum flux value, $\Phi_{max\ M}$ is a mean of the first measured maximum flux value and the second measured maximum flux value, and $\Phi_{min\ M}$ is the measured minimum flux value associated with the magnetic flux in the first direction; and wherein the first gain is determined based on the first offset, one of the first measured maximum flux value and the second measured maximum flux value, and one of the first reference maximum flux value and the second reference maximum flux value associated with the magnetic flux in the first direction using the equation:

$$FirstGain = \frac{\Phi_{max\ R}}{FirstOffset + \Phi_{max\ M}},$$

wherein $\Phi_{max\ R}$ is one of the first reference maximum flux value and the second reference maximum flux value and $\Phi_{max\ M}$ is one of the first measured maximum flux value and the second measured maximum flux value.

12. The computer-implemented method of claim 11, wherein determining the first offset comprises:
calculating the first offset using the equation:

$$SecondOffset = \frac{\Phi_{min\ M} \cdot \frac{\Phi_{max\ R}}{\Phi_{min\ R}} - \Phi_{max\ R}}{1 - \frac{\Phi_{max\ R}}{\Phi_{min\ R}}},$$

wherein $\Phi_{max\ R}$ is a mean of the first reference maximum flux value and the second reference maximum flux value, $\Phi_{min\ R}$ is the reference minimum flux value, $\Phi_{max\ M}$ is a mean of the first measured maximum flux value and the second measured maximum flux value, and $\Phi_{min\ M}$ is the measured minimum flux value associated with the magnetic flux in the first direction; and wherein the first gain is determined based on the first offset, the measured minimum flux value, and the reference minimum flux value associated with the magnetic flux in the first direction using the equation:

$$FirstGain = \frac{\Phi_{min\ R}}{FirstOffset + \Phi_{min\ M}},$$

wherein $\Phi_{min\ R}$ is the reference minimum flux value and $\Phi_{min\ M}$ is the measured minimum flux value.

13. The computer-implemented method of claim 1, wherein determining the second offset comprises:
calculating the second offset using the equation:

$$SecondOffset = \frac{\Phi_{min\ M} \cdot \frac{\Phi_{max\ R}}{\Phi_{min\ R}} - \Phi_{max\ R}}{1 - \frac{\Phi_{max\ R}}{\Phi_{min\ R}}},$$

wherein $\Phi_{max\ R}$ is the reference maximum flux value, $\Phi_{min\ R}$ is the reference minimum flux value, $\Phi_{max\ M}$ is the measured maximum flux value, and $\Phi_{min\ M}$ is the measured minimum flux value associated with the magnetic flux in the second direction; and wherein the second gain is determined based on the second offset, the measured maximum flux value, and the reference maximum flux value associated with the magnetic flux in the second direction using the equation:

$$SecondGain = \frac{\Phi_{max\ R}}{SecondOffset + \Phi_{max\ M}},$$

wherein $\Phi_{max\ R}$ is the reference maximum flux value and $\Phi_{max\ M}$ is the measured maximum flux value.

14. The computer-implemented method of claim 1, wherein determining the second offset comprises:
calculating the second offset using the equation:

$$SecondOffset = \frac{\Phi_{min\ M} \cdot \frac{\Phi_{max\ R}}{\Phi_{min\ R}} - \Phi_{max\ R}}{1 - \frac{\Phi_{max\ R}}{\Phi_{min\ R}}},$$

wherein $\Phi_{max\ R}$ is the reference maximum flux value, $\Phi_{min\ R}$ is the reference minimum flux value, $\Phi_{max\ M}$ is the measured maximum flux value, and $\Phi_{min\ M}$ is the measured minimum flux value associated with the magnetic flux in the second direction; and wherein the second gain is determined based on the second offset, the measured minimum flux value, and the reference minimum flux value associated with the magnetic flux in the second direction using the equation:

$$SecondGain = \frac{\Phi_{min\ R}}{SecondOffset + \Phi_{min\ M}},$$

wherein $\Phi_{min\ R}$ is the reference minimum flux value and $\Phi_{min\ M}$ the measured minimum flux value.

15. A non-transitory computer-readable storage medium comprising a set of instructions for detecting a position of a magnet system, the set of instructions to direct a processor perform acts of:
instructing a position sensor to measure a magnetic flux of a magnetic field in a first direction that is produced by a magnet system and instructing the position sensor to measure a magnetic flux of a magnetic field in a second direction that is produced by the magnet system, where the first direction and the second direction are different directions;

determining a first offset based on a first measured maximum flux value, a second measured maximum flux value, and a measured minimum flux value associated with the measured magnetic flux in the first direction and a first reference maximum flux value, a second reference maximum flux value, and a reference minimum flux value associated with the magnetic flux in the first direction;

determining a first gain based on the first offset, one of the first measured maximum flux value and the second maximum flux value, and one of the first reference maximum flux value and the second reference maximum flux value associated with the magnetic flux in the first direction, or based on the first offset, the measured minimum flux value, and the reference minimum flux value associated with the magnetic flux in the first direction;

adjusting at least a portion of the values of the measured magnetic flux in the first direction based on the first gain and the first offset, where the adjustment occurs at at least one of a zero crossing associated with the magnetic flux in the first direction and a zero crossing associated with the magnetic flux in the second direction;

determining a second offset based on a measured maximum flux value and a measured minimum flux value associated with the measured magnetic flux in the second direction and a reference maximum flux value and a reference minimum flux value associated with the magnetic flux in the second direction;

determining a second gain based on the second offset, the measured maximum flux value, and the reference maximum flux value associated with the magnetic flux in the second direction, or based on the second offset, the measured minimum flux value, and the reference minimum flux value associated with the magnetic flux in the second direction;

adjusting at least a portion of the values of the measured magnetic flux in the second direction based on the second gain and the second offset, where the adjustment occurs at at least one of a zero crossing associated with the magnetic flux in the first direction and a zero crossing associated with the magnetic flux in the second direction; and determining a position of the magnet system with respect to the position sensor at a given time based on the adjusted values of the measured magnetic flux in the first direction and the adjusted values of the measured magnetic flux in the second direction.

16. The computer-readable storage medium of claim 15, wherein determining the position of the magnet system with respect to the position sensor at a given time comprises:
obtaining a value from a lookup table that is associated with a relationship between the adjusted value of the measured magnetic flux in the first direction at the given time and the adjusted value of the measured magnetic flux in the second direction at the given time; and
linearizing the value from the lookup table.

17. A linear position sensor system for detecting a position of a magnet system with respect to a position sensor, the system comprising:
a position sensor configured to measure a magnetic flux of a magnetic field produced by a magnet system; and
a controller in communication with the position sensor, the controller comprising a computer-readable storage medium and a processor, the controller configured to:
direct the position sensor to measure a magnetic flux of a magnetic field in a first direction that is produced by a magnet system and to direct the position sensor to measure a magnetic flux of a magnetic field in a second direction that is produced by the magnet system, where the first direction and the second direction are different directions;
determine a first offset based on measured maximum and minimum flux values of the measured magnetic flux in the first direction and reference maximum and minimum flux values of the magnetic flux in the first direction;
determine a first gain based on the first offset, a measured maximum flux value of the measured maximum flux values, and a reference maximum flux value of the reference maximum flux values in the first direction, or based on the first offset, the measured minimum flux value, and the reference minimum flux value in the first direction;
adjust at least a portion of the values of the measured magnetic flux in the first direction based on the first gain and the first offset, where the adjustment occurs at at least one of a zero crossing associated with the magnetic flux in the first direction and a zero crossing associated with the magnetic flux in the second direction;
determine a second offset based on measured maximum and minimum flux values of the measured magnetic flux in the second direction and reference maximum and minimum flux values of the magnetic flux in the second direction;
determine a second gain based on the second offset, the measured maximum flux value, and the reference maximum flux value in the second direction, or based on the second offset, the measured minimum flux value, and the reference minimum flux value in the second direction;
adjust at least a portion of the values of the measured magnetic flux in the second direction based on the second gain and the second offset, where the adjustment occurs at at least one of a zero crossing associated with the magnetic flux in the first direction and a zero crossing associated with the magnetic flux in the second direction; and
determine a position of the magnet system with respect to the position sensor at a given time based on the adjusted values of the measured magnetic flux in the first direction and the adjusted values of the measured magnetic flux in the second direction.

18. The system of claim 17, wherein to determine the position of the magnet system with respect to the position sensor at a given time, the controller is configured to:
obtain a value from a lookup table that is associated with a relationship between the adjusted value of the measured magnetic flux in the first direction at the given time and the adjusted value of the measured magnetic flux in the second direction at the given time; and
linearize the value from the lookup table.

19. The system of claim 17, wherein the controller is further configured to determine whether the position sensor is malfunctioning based on at least one of a plausibility check associated with the measured maximum and minimum magnetic flux values and the corresponding reference maximum and minimum magnetic flux values in the first direction, and a plausibility check associated with the measured maximum and minimum magnetic flux values and the corresponding reference maximum and minimum magnetic flux values in the second direction.

20. A computer-implemented method for detecting a position of a magnet system, the method comprising:

measuring, at a position sensor, a magnetic flux of a magnetic field in a first direction that is produced by a magnet system and measuring, at the position sensor, a magnetic flux of a magnetic field in a second direction that is produced by the magnet system, wherein the first and second directions are different directions;

adjusting, with a controller, at least a portion of the values of the measured magnetic flux in the first direction based on a first gain and a first offset, the first gain and the first offset determined based on measured maximum and minimum flux values of the measured magnetic flux in the first direction and reference maximum and minimum flux values of the magnetic flux in the first direction, where the adjustment occurs at at least one of a zero crossing associated with the magnetic flux in the first direction and a zero crossing associated width the magnetic flux in the second direction;

adjusting, with the controller, a at least a portion of the values of the measured magnetic flux in the second direction based on a second gain and a second offset, the second gain and the second offset determined based on measured maximum and minimum flux values of the measured magnetic flux in the second direction and reference maximum and minimum flux values of the magnetic flux in the second direction, where the adjustment occurs at at least one of a zero crossing associated with the magnetic flux in the first direction and a zero crossing associated with the magnetic flux in the second direction; and determining, with the controller, a position of the magnet system with respect to the position sensor at a given time based on the adjusted values of the measured magnetic flux in the first direction and the adjusted values of the measured magnetic flux in the second direction.

21. The computer-implemented method of claim 20, wherein the controller comprises an application-specific integrated circuit.

22. The computer-implemented method of claim 20, wherein the controller comprises a processor.

* * * * *

UNITED STATES PATENT AND TRADEMARK OFFICE
CERTIFICATE OF CORRECTION

PATENT NO. : 8,335,659 B2
APPLICATION NO. : 12/836901
DATED : December 18, 2012
INVENTOR(S) : Salvador Hernandez-Oliver et al.

Page 1 of 1

It is certified that error appears in the above-identified patent and that said Letters Patent is hereby corrected as shown below:

Title Page, Item 73 should read

Assignee: Tyco Electronics Corporation, Berwyn, PA (US) and
Tyco Electronics AMP GmbH (DE) and
Tyco Electronics Belgium EC BVBA (Belgium)

Signed and Sealed this
Fourteenth Day of May, 2013

Teresa Stanek Rea
*Acting Director of the United States Patent and Trademark Office*

UNITED STATES PATENT AND TRADEMARK OFFICE
CERTIFICATE OF CORRECTION

PATENT NO. : 8,335,659 B2
APPLICATION NO. : 12/836901
DATED : December 18, 2012
INVENTOR(S) : Salvador Hernandez-Oliver et al.

It is certified that error appears in the above-identified patent and that said Letters Patent is hereby corrected as shown below:

In the Specification
In Column 4, lines 47 - 53, replace the First Offset formula with the following;

$$FirstOffset = \frac{\Phi_{min\,M} \cdot \frac{\Phi_{max\,R}}{\Phi_{min\,R}} - \Phi_{max\,M}}{1 - \frac{\Phi_{max\,R}}{\Phi_{min\,R}}},$$

In Column 6, lines 36 - 42, replace the Second Offset formula with the following;

$$Second\ Offset = \frac{\Phi_{min\,M} \cdot \frac{\Phi_{max\,R}}{\Phi_{min\,R}} - \Phi_{max\,M}}{1 - \frac{\Phi_{max\,R}}{\Phi_{min\,R}}},$$

In the Claims
In Claim 11, replace the First Offset formula with the following;

$$FirstOffset = \frac{\Phi_{min\,M} \cdot \frac{\Phi_{max\,R}}{\Phi_{min\,R}} - \Phi_{max\,M}}{1 - \frac{\Phi_{max\,R}}{\Phi_{min\,R}}},$$

In Claim 12, replace the Second Offset formula with the following;
In Claim 13, replace the Second Offset formula with the following;
In Claim 14, replace the Second Offset formula with the following;

$$Second\ Offset = \frac{\Phi_{min\,M} \cdot \frac{\Phi_{max\,R}}{\Phi_{min\,R}} - \Phi_{max\,M}}{1 - \frac{\Phi_{max\,R}}{\Phi_{min\,R}}},$$

Signed and Sealed this
Twenty-sixth Day of November, 2013

Margaret A. Focarino
*Commissioner for Patents of the United States Patent and Trademark Office*